United States Patent [19]

Chisum

[11] 4,168,675

[45] * Sep. 25, 1979

[54] MACHINE TO PREPARE LOGS FOR LOG HOUSES

[76] Inventor: Finis L. Chisum, P.O. Box 1145, Claremore, Okla. 74017

[*] Notice: The portion of the term of this patent subsequent to Apr. 20, 1993, has been disclaimed.

[21] Appl. No.: 812,817

[22] Filed: Jul. 5, 1977

Related U.S. Application Data

[60] Division of Ser. No. 678,238, Apr. 19, 1976, Pat. No. 4,097,350, which is a continuation-in-part of Ser. No. 571,373, Apr. 24, 1975, Pat. No. 3,951,187.

[51] Int. Cl.² .................... B05C 5/00; B27C 1/00; B27C 5/06; B27C 9/00
[52] U.S. Cl. .................................. 118/35; 83/425; 83/473; 118/316; 118/326; 144/2 R; 144/3 R
[58] Field of Search ............... 21/65; 144/2 R, 3 R, 144/312, 324, 327, 3 A, 3 B, 3 C; 83/425, 473; 118/35, 316, 326

[56] References Cited

U.S. PATENT DOCUMENTS

| 2,800,932 | 7/1957 | Scott | 83/473 |
| 2,918,951 | 12/1959 | Haumann | 144/3 A |
| 2,987,085 | 6/1961 | Porter | 144/3 B |
| 3,016,931 | 1/1962 | Brunkow et al. | 144/3 A |
| 3,276,492 | 10/1966 | Kervefors | 144/3 R |
| 3,343,519 | 9/1967 | Chapman et al. | 118/326 |
| 3,538,963 | 11/1970 | Adams | 83/473 |
| 3,538,964 | 11/1970 | Warrick et al. | 83/473 |
| 3,540,498 | 11/1970 | Woloveke et al. | 144/3 R |
| 3,583,450 | 6/1971 | Gunnerman | 144/312 |
| 3,686,990 | 8/1972 | Margolien | 83/473 |
| 3,802,474 | 4/1974 | Fell | 144/2 R |
| 3,880,036 | 4/1975 | Yokoyama | 83/425 |
| 3,885,483 | 5/1975 | Ikeya et al. | 144/312 |
| 3,951,187 | 4/1976 | Chisum | 144/1 R |

Primary Examiner—Morris O. Wolk
Assistant Examiner—Bradley Garris
Attorney, Agent, or Firm—Head, Johnson & Chafin

[57] ABSTRACT

Method and machine and a log product for log house construction includes improvements in apparatus to shape, and finish the logs, divide into halves or quarter sections for tongue-and-groove assembly construction of floors, walls, or ceilings appurtenant to the log house. Equally-spaced holes between the tongues and grooves provide additional functional uses for utility lines or vertical supports as needed. The logs are finished by spraying them with selected fluids such as preservatives.

7 Claims, 15 Drawing Figures

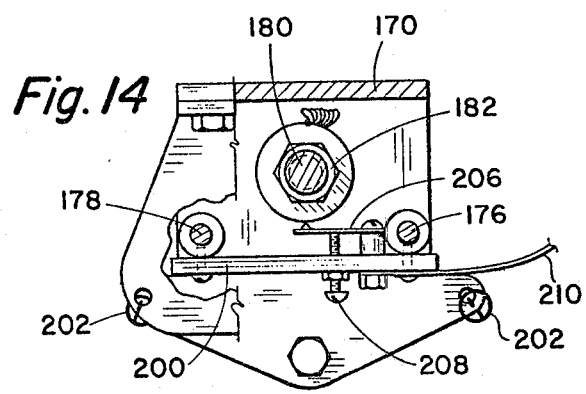
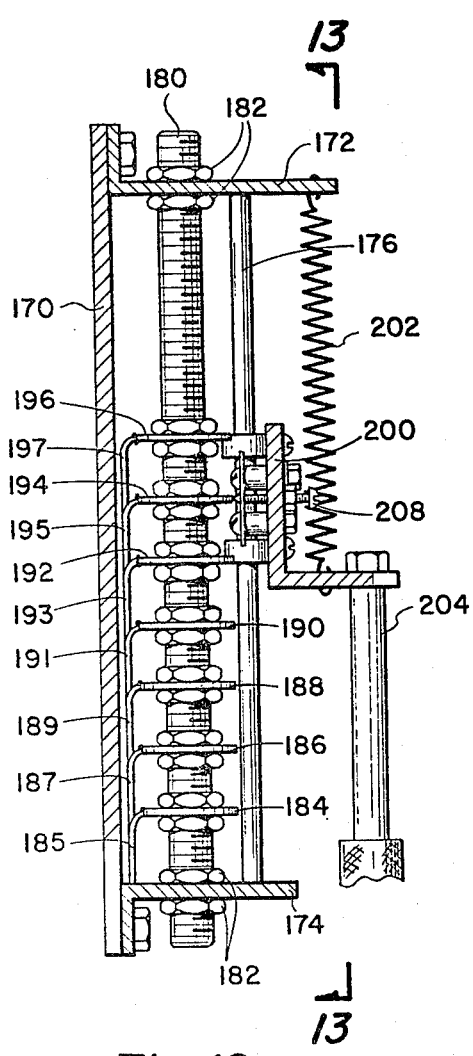
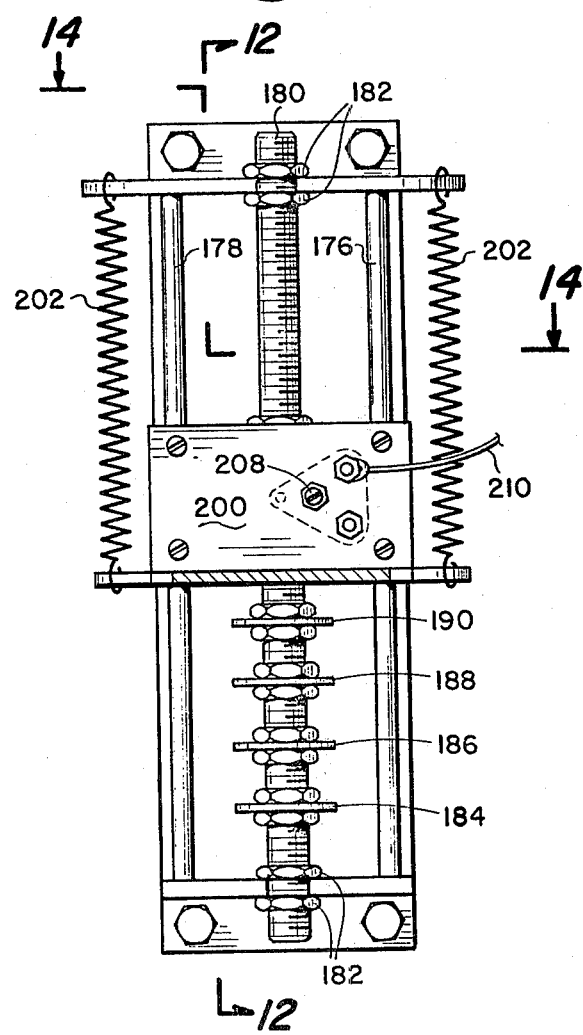
Fig. 14
Fig. 12
Fig. 13

MACHINE TO PREPARE LOGS FOR LOG HOUSES

CROSS REFERENCE

This is a division of application Ser. No. 678,238, filed Apr. 19, 1976, now U.S. Pat. No. 4,097,350.

Application Ser. No. 678,238 is a continuation-in-part of Ser. No. 571,373 filed Apr. 24, 1975, now U.S. Pat. No. 3,951,187, issued Apr. 20, 1976.

PRIOR ART

| U.S. Pat.: | | |
|---|---|---|
| 375,893 | 2,005,921 | 3,010,495 |
| 391,648 | 2,263,036 | 3,016,074 |
| 442,471 | 2,382,896 | 3,017,911 |
| 988,860 | 2,561,746 | 3,292,677 |
| 1,106,177 | 2,596,187 | 3,442,310 |
| 1,223,597 | 2,602,476 | 3,457,978 |
| 1,543,165 | 2,712,678 | 3,752,201 |
| | | 3,848,647 |
| | Australian Patent No. | 108,956 |

BACKGROUND OF THE INVENTION

This invention lies in the field of housing construction and preparation of a lumber product therefor. More particularly, it concerns the preparation of cylindrical logs of selected diameters and lengths, prepared so that they can be rapidly set up in the form of walls of a house or building.

In the days before the development of suitable saw mills for the preparation of board lumber for the construction of homes, logs were cut by hand to be more or less of a selected cylindrical size and were fitted together by means of saddle notches, etc. to provide an enclosure for the purpose of protection from the weather, etc.

The construction of a house in the form of a log cabin has notable advantages, particularly in the strength and rigidity of the structure and in the thermal insulation provided by the thick wood logs. However, because of the difficulty of providing truly cylindrical logs, properly fitted with tongues and grooves so as to seal against the weather, the construction of houses by the use of sawed lumber advanced while the construction of log cabins terminated.

However, there are certain advantages in the use of a log cabin for style and comfort, but also in the fact that in many wilderness areas where industry requires the attendance of a number of people, it is difficult to provide the kind of saw mill required to cut logs to the proper lumber size for conventional housing construction.

In the prior art, logs have been prepared for the construction of log houses by the use of a more or less conventional lathe, in which the raw log was clamped between centers and rotated by the lathe head. Cutters were provided to travel along the lathe bed to cut down to a selected diameter. The logs were then moved to and put on a milling machine which was used to cut the flats on top and bottom and to provide the tongue and groove construction as desired. The logs were then moved to a third location to cut the saddle notches and to cut them to precise length, etc. All of this required separate handling and transport, was expensive and required considerable man power and machinery, and was therefore too expensive to be used commercially in competition with commercial housing construction.

In addition, the prior art has not allowed for apparatus to be utilized to form logs for construction of floors, walls or ceilings appurtenant to the log house construction.

SUMMARY OF THE INVENTION

This invention describes a self-contained simple apparatus for efficiently handling logs of various diameters and lengths for the preparation of cylindrical logs modified with tongue and groove surfaces on top and bottom respectively, for the construction of homes or buildings. Such a self-contained apparatus is simpler and cheaper than the conventional type of saw mill and is, therefore, well adapted to be carried into wilderness areas for the construction of housing, particularly where there is plenty of timber of suitable size, etc.

It is a primary object of this invention to provide a self-contained machine for the complete machining of logs into finished log timbers, for the construction of log housed and buildings. It is a further object of this invention to provide a machine for the complete machining of logs for log houses without separate manual handling.

It is a still further object of this invention to provide means for turning the logs to a selected diameter; to provide separate means for collecting the chips of the bark of the logs, and the chips of the white wood of the logs, since these are marketed separately; means to machine top and bottom surfaces of the log to provide adequate parallel seating of logs on top of each other and to provide and seal against the weather by means of appropriate double tongue and groove construction; means to cut saddle notches, at desired locations, of various selected diameters; means to cut the logs to proper length; means to cut plural vertical notches in the ends of logs for the purpose of inserting seals, utility lines, door jams and windows; means to drill through the log, between the double tongues and grooves, a plurality of equally spaced vertical holes for utility lines, and reinforcing purposes; means to longitudinally cut the log vertically and/or horizontally to divide the log into a plurality of members for use elsewhere in the construction of log houses as floors, ceilings, the initial base log, etc.; and means to pre-dry and finish the log with suitable preservants, sealants, and finishes as would be available to those skilled in the art.

More particularly, this invention has for its object improvements upon and additions to the apparatus, processes, and methods which are disclosed in said copending U.S. Pat. No. 3,951,187, which Patent and essential material therein is incorporated by reference hereto as "log mill patent".

BRIEF DESCRIPTION OF THE DRAWINGS

These and other objects and advantages of the invention and a better understanding of the principles and details of the invention will be evident from the following appended drawings in addition to those incorporated by reference to said "log mill patent".

FIG. 12 is a side elevational view of a switch utilizing this invention to automatically control the setting of the apparatus utilized to turn the log to a desired diameter and to actuate the tongue-and-groove cutters in accordance with that desired size.

FIG. 13 is a frontal view of the switch taken along the line 13—13 of FIG. 12.

FIG. 14 is a partial sectional view taken along the line 14—14 of FIG. 13.

DESCRIPTION OF THE PREFERRED EMBODIMENT

Before explaining the present invention in detail, it is to be understood that the invention is not limited in its application to the details of construction and arrangement of parts illustrated in the accompanying drawings since the invention is capable of other embodiment and of being practiced or carried out in a variety of ways. Also, it is to be understood that the phraseology or terminology employed herein is for the purpose of description and not of limitation.

Figure 1:
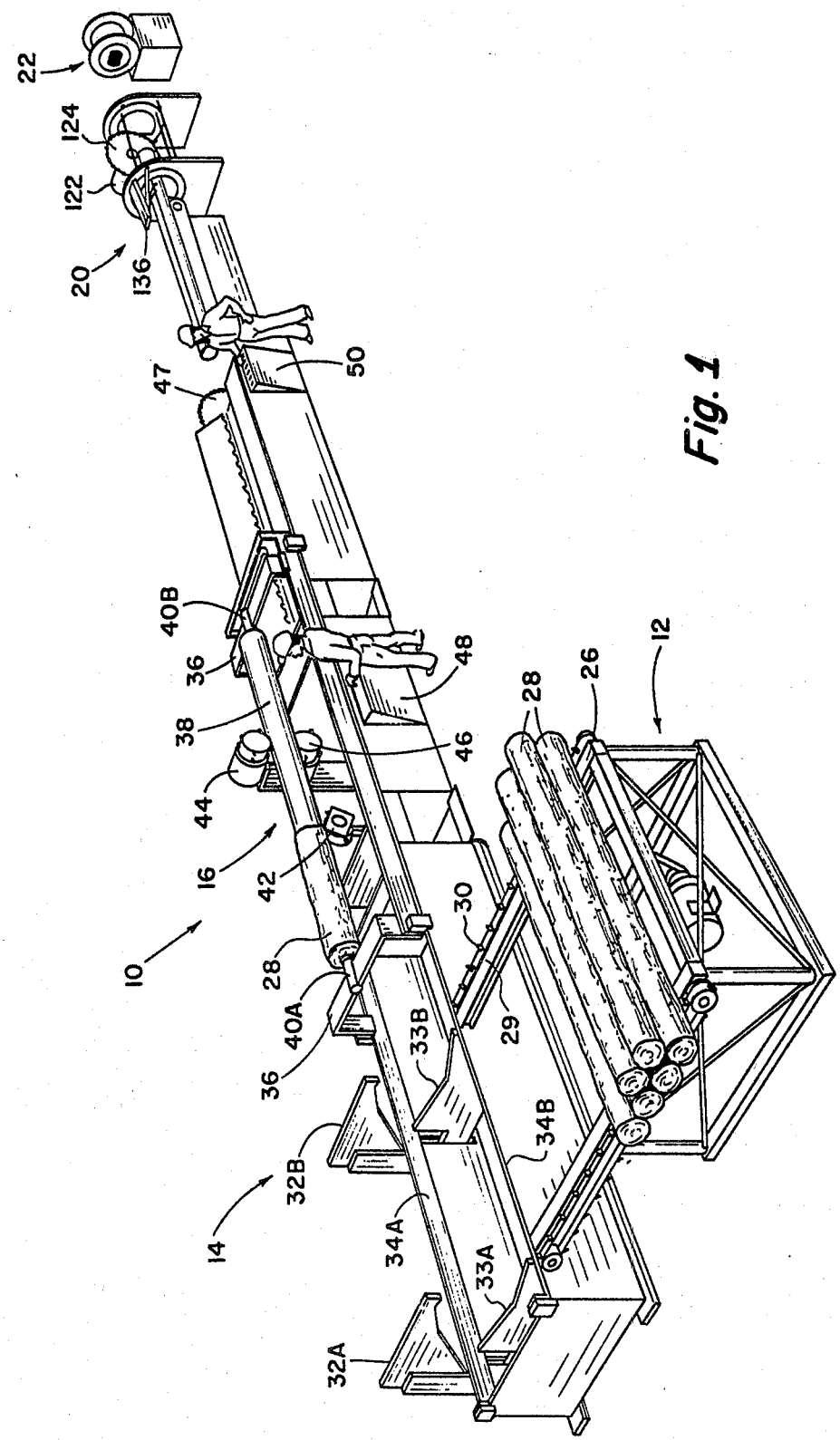
FIG. 1 is a generalized overview of the apparatus with the improvements and additions of this invention included therewith.

Referring now to the drawings and in particular to FIG. 1, there is illustrated generally by the numeral 10 the overall machine for the presentation of logs for building log cabins. The numeral 12 indicated generally the log input portion of the machine. The numeral 14 indicates generally the portion of the machine utilized for the loading of a log and centering it between centers on the carriage. Numeral 16 illustrates generally the portion of the machine utilized for the cutting of the log down to a selected diameter, and for cutting the top and bottom surfaces for proper tongue and groove construction. Numeral 18 indicates generally the portion of the machine which carries out the cutting of the saddle notches and prepares the ends cut to selected length and cut with vertical notches, for purposes of joining logs end to end, etc.

Numeral 20 generally indicates the log slitter for dividing the log longitudinally in a vertical and/or horizontal and/or angular direction.

Numeral 22 generally indicates the log preservative and finishing apparatus.

The logs 28 are loaded by any means onto a loading platform 26. There is a horizontal track 29 with suitable motor driven chain 30 that carries the logs horizontally until they are over the longitudinal rails or tracks 34A and 34B of the machine, and they then are rolled into a pair of centering devices 33A and 33B. The parts 33A and 33B co-act with appropriate parts 32A and 32B, as is more fully explained in said log mill patent, so that as the parts 33 move upward, the parts 32 move downward, to grasp the log and center it with respect to a travelling carriage 36 which runs on the rails 34A and 34B. 34A and 34B are extensions, one of the other, and are numbered separately since they cover different portions of the machine where different operations are carried out. The carriage 36 is capable of running the full length of the machine.

After the log is loaded into the parts 33A and 33B of the self-centering device, the carriage is moved to the left until it is directly over the log, and then the centering devices 33, and 32 are brought into action to lift the log and center it with respect to appropriate centers 40A and 40B mounted on the carriage 36. The two centering devices 32A and 32B, etc. are independently acting so that even though the log that they are grasping is of a tapered form, it will be centered so that the axis of the log will be colinear with the centers 40A and 40B of the carriage. The centers are then pressed into the wood so that the log is supported entirely by the centers and the carriage. The parts 32, 33 are then retracted. As described in said log mill patent, a power drive on one of the centers permits rotation of the log at any selected speed.

One or more cutters 42 is brought upward into contact with the log and rotated at high speed, while the log itself is rotated and moved longitudinally to the right into the cutters 42 so that a long, smooth, cylindrical and balanced log 38 is provided out of the rough log.

Figure 10:
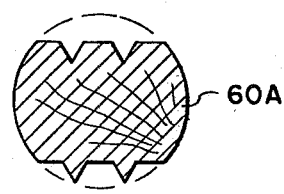
FIGS. 10 and 11 are sectional views of a typical log product manufactured in accordance with this invention.
Figure 11:
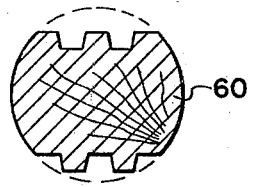

The cutters 42 are then retracted and the log may then be pre-dried by rotating at high speed, in some instances even higher than that used to create the finished log, wherein it has been found that large amounts of water within the log are thrown outward by centrifugal force and thus establish a material amount of pre-drying of the log that may, in some instances, make it unnecessary to have any kiln drying of the log as has been heretofore known in the art. In other instances it may be necessary to include additional high temperature kiln drying depending upon the characteristics of the logs being worked upon. This drying operation typically is accomplished either at section 16 or section 14 of the apparatus of this invention. The carriage is then brought back to the left, and then makes a second pass to the right. While it moves to the right, tongue and groove cutters 44 and 46, respectively, are brought into contact with the top and bottom of the log. These are rapidly rotating multi-bladed cutters which are shaped so as to provide a cross-section of the log such as shown in FIGS. 10 and 11.

At the end of this machining operation, the carriage is in the extreme position to the right. At that point a table is brought up from below to support the log so that the centers can be withdrawn, and then with the log resting on the table, the table is lowered so as to clear the carriage, which then moves back to the left, ready to pick up a second log, which has already been loaded onto the self-centering device. The machined log, while on the table at the right end of the machine, is clamped to the table. The saddle notch is cut, the ends are cut using cross-cut saw 47 and the ends are notches with a dual vertical notch, if desired, as explained in said log mill patent and shown in FIG. 2.

Since there two principal types of operation, there can be two sets of controls one at 48, which handles the first two operations of debarking and of cutting the tongues and grooves, and the other station 50 controls the end cuts, and the additional processes and apparatus herein described, etc. It is to be understood, however, that a single control area for all operations is within the scope of this invention.

LOG PRODUCT

Figure 3:
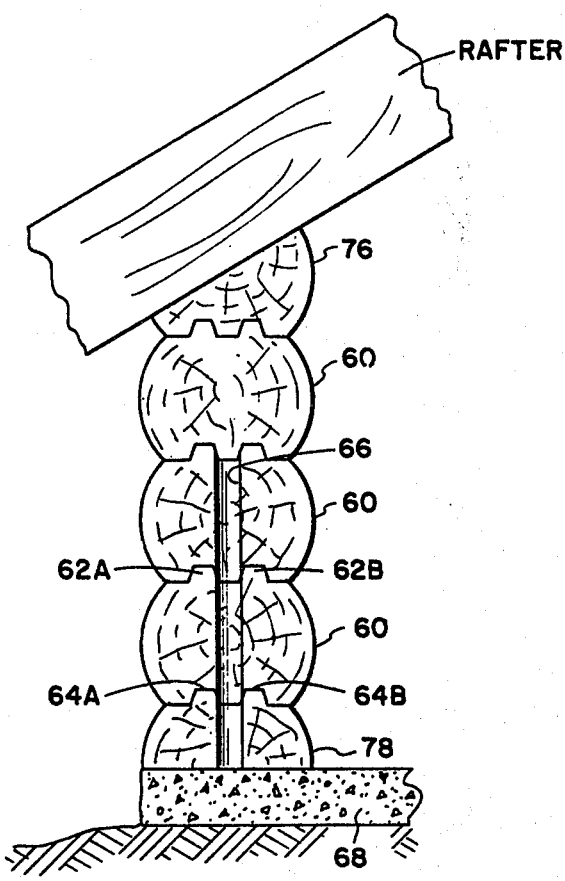
FIG. 3 is a partial sectional view of typical log house sidewall construction utilizing the logs of this invention.
Figure 2:
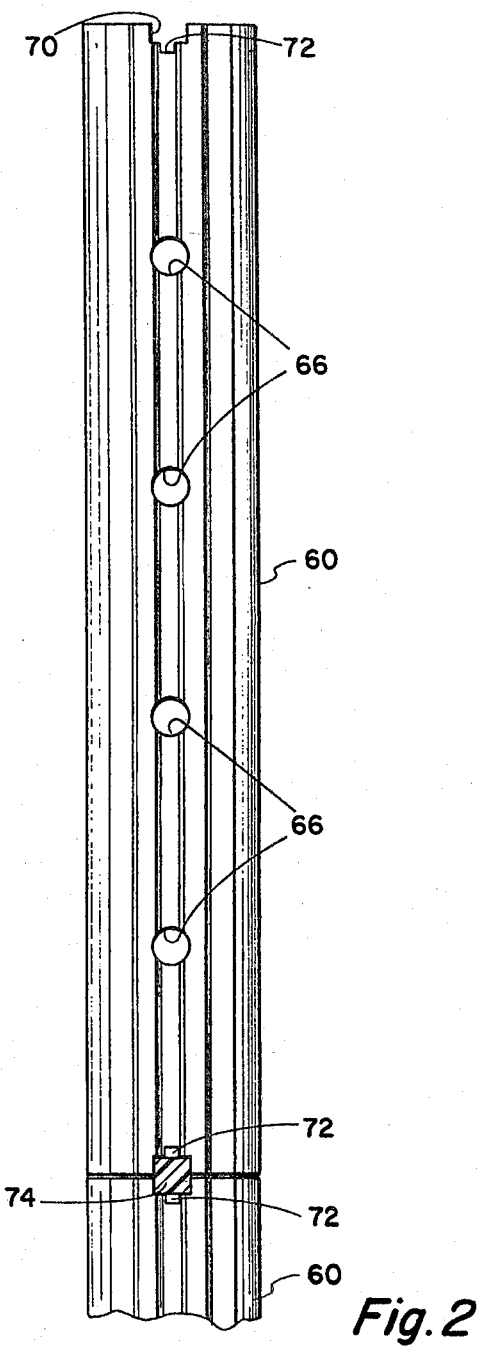
FIG. 2 is a top elevational view of the log product as constructed according to this invention.

The log product of this invention is depicted in FIGS. 2, 3, 4, 10 and 11, and basically comprises a generally cylindrical member 60 or 60A cut to the longitudinal length desired and having substantially flattened top with tongues 62A and 62B with the bottom having matching grooves 64A and 64B. In one embodiment a plurality of vertical holes 66 are provided in that space between the tongue and grooves as shown in FIGS. 2 and 3 and adapted to be utilized in conjunction with vertical support members from a base 68 or conduits for utility lines, e.g., telephone, electrical, gas or water as needed. The ends of the log include a first end groove 70 and a second smaller groove 72. As shown in FIG. 2, where abutting logs meet, groove 70 provides access to insertion of a sealing material 74, such as a rectangular plastic member (e.g. foamed plastics). In addition, groove 70 provides means for connection of window or door framing material necessary in the log house construction. Conduit 72 provides an additional vertical conduit for utility lines, etc. FIGS. 10 and 11 are cross-sectional views of types of log construction within the scope of this invention. It has been found that a double tongue and groove construction controls shrinkage splits in the log not possible with a single tongue and groove.

A log slitter hereinafter described permits the construction of logs such as rafter logs 76 and base half logs 78, shown in FIG. 3. Dividing the log of this invention in a vertical direction between the tongue and grooves creates log halves 80 for tongue-and-groove construction of floors, roofs, ceilings, or other areas or needs.

LOG SLITTER

Referring now to FIGS. 5, 6, 7 and 8, the log slitter, generally designated by the numeral 20, is positioned preferably downstream of the previous mill operations as disclosed in the log mill patent.

Figure 4:
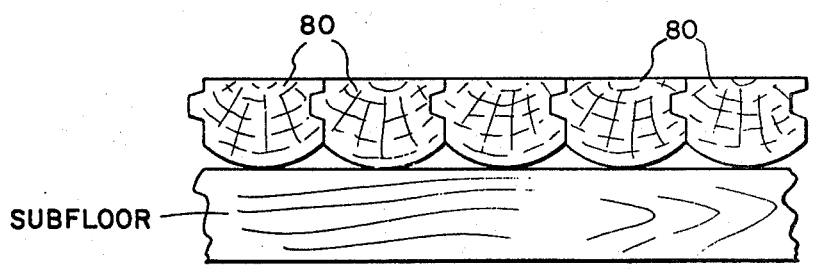
FIG. 4 is a partial sectional view depicting the utilization of vertically cut logs in accordance with this invention for use as a floor, ceiling or other finishing surface.
Figure 6:
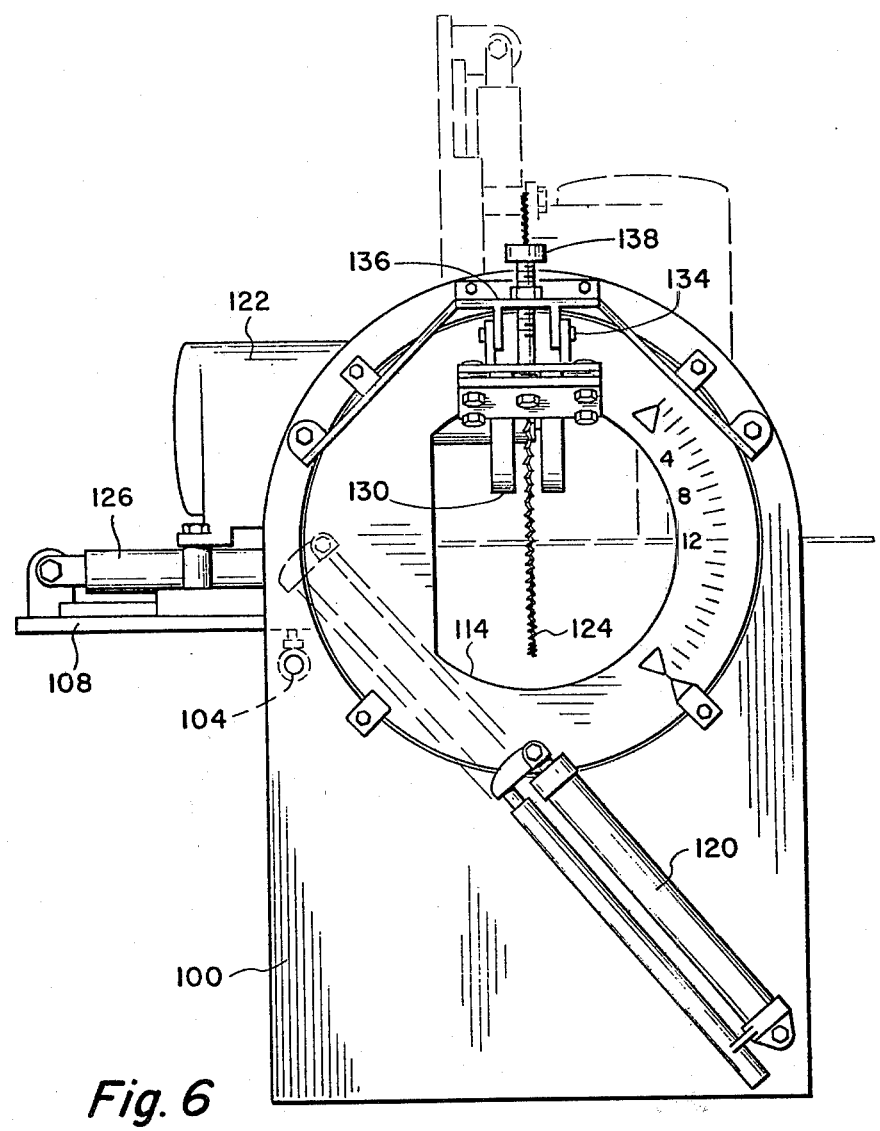
FIG. 6 is a frontal view of the log slitter taken along the line 6—6 of FIG. 5.
Figure 7:
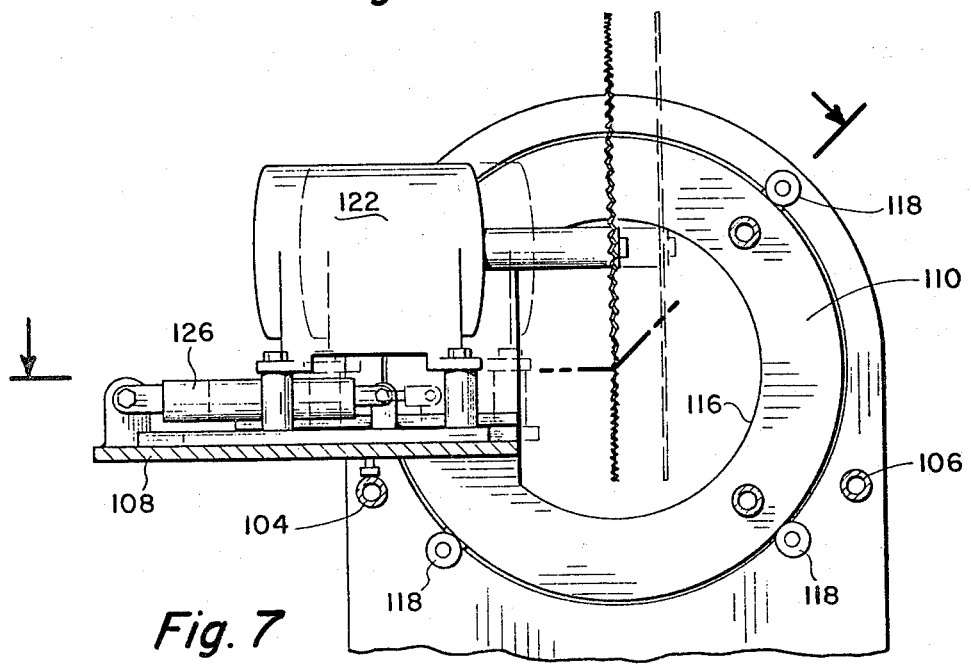
FIG. 7 is a partial sectional view taken along the line 7—7 of FIG. 5.
Figure 8:
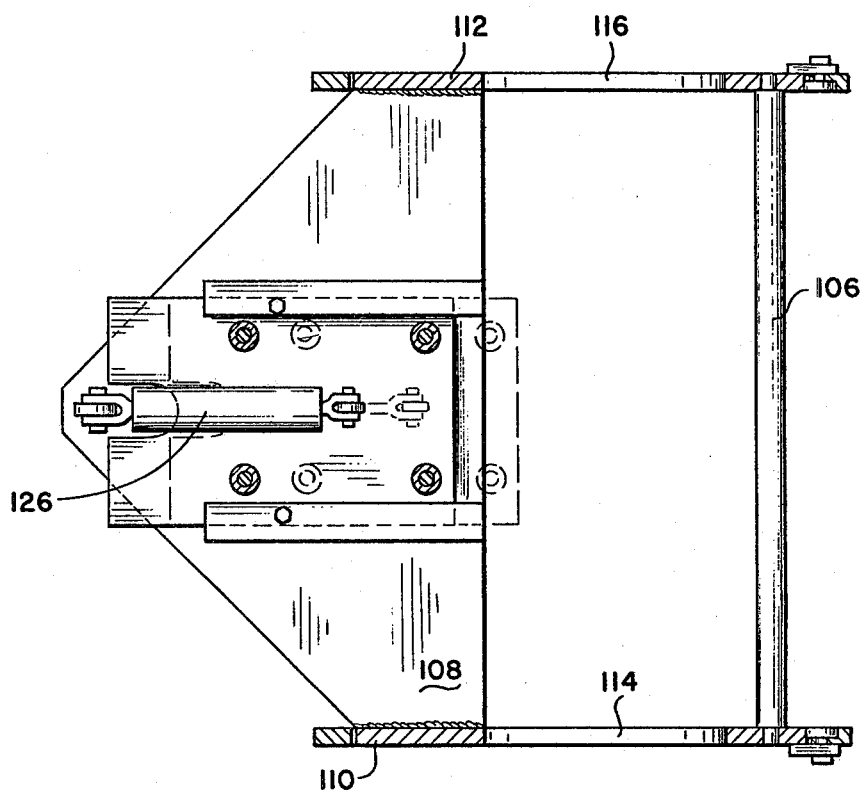
FIG. 8 is a top sectional view taken along the line 8—8 of FIG. 7.

The slitter comprises vertical upstream frame 100 spaced from downstream frame 102 and connected by horizontal supports 104 and 106. Rotatably secured between frames 100 and 102 is platform 108 which is connected to an upstream ring 110 and downstream ring 112, which rings have axially aligned openings 114 and 116, respectively, for receiving the log product of this invention. The entire slitting assembly 108, 110 and 112 is rotatably secured upon equally spaced bearings or rollers 118 and movable by a remote controlled hydraulic cylinder 120 in order that the saw may be rotated to a variety of angular positions between vertical and horizontal as shown by the dotted lines in FIG. 6. The rotatable saw assembly includes a motor 122 to which saw blade 124 is directly attached. The motor and saw assembly is movable inwardly and outwardly upon platform 108 by remotely controlled hydraulic cylinder and piston means 126 as shown by the dotted lines of FIGS. 7 and 8. Suitable indicia and pointer means as shown in FIG. 6 are utilized by the operator to achieve a variety of angular relationships necessary to cut either vertically through the log to produce logs 80 as shown in FIG. 4, horizontally through the log to produce log 78 as shown in FIG. 3 or at a desired angular relationship to produce log 76 also shown in FIG. 3. Quarter section members are also possible. The numbers shown in FIG. 6 relate to the desired pitch angle for particular rafter construction. The slitter also includes a conveyor system 128 to assist in the movement of the log through the log slitter 20. Upstream of the log slitter and connected to the framework thereto is a flat spring member 130, which is pivotally supported about point 134 to the supportive framework 136. The spring acts as a hold-down and anti-kickback device to maintain the log in constant position as it traverses through the log slitter. Suitable adjustment means 138 is provided to apply additional pressure upon the log as desired.

LOG FINISHER

Figure 5:
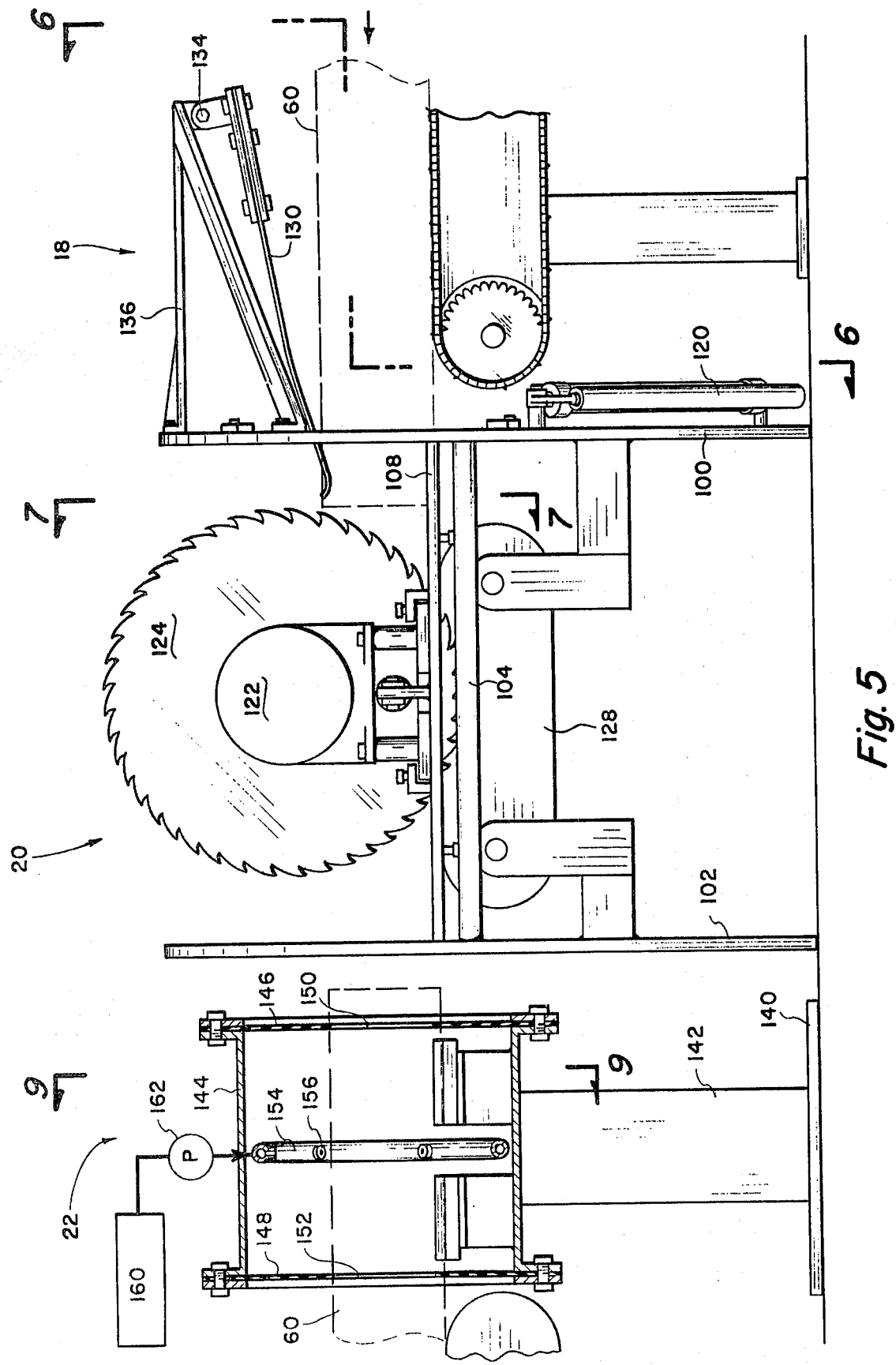
FIG. 5 is a side elevational view of the log slitter and log finishing apparatus.
Figure 9:
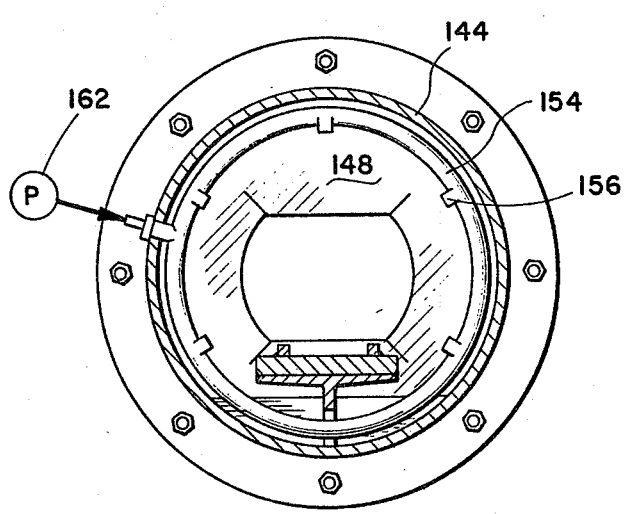
FIG. 9 is a sectional view taken along the line 9—9 of FIG. 5.

The log finishing apparatus as generally designated by the numeral 22 is shown in FIGS. 5 and 9 and includes a base portion 140, a support pedestal 142 to which cylindrical member 144 is positioned to axially receive the log 66 therethrough. An upstream resilient and flexible seal curtain member 146 and a like downstream flexible seal member 148 have respective openings 150 and 152 designed so as to substantially seal about the cross-section of log 60. Within the finishing device is a circular ring conduit 54 which includes a plurality of spaced spray nozzles 156 wherein finish, preservatives, stains, or other materials for finishing the log are injected and sprayed thereabout from a source of supply schematically shown at 160 to the spray ring 154 by pump 162.

CUT-OFF SWITCH

FIGS. 12, 13 and 14 describe a cut-off switch generally designated by the numeral 169 useful in making extremely fine adjustments as to the location of the initial debarking and diameter cutter and the tongue and grooving cutters of this invention relative to the particular size of the log desired. Separate but identical switches for each include frame 170 for each having an upper and lower bracket 172, 174, respectively, between which are vertical support rods 176 and 178. Vertically disposed between the upper and lower plates is a threaded shaft 180 which is adjustable upwardly and downwardly and locked into place by lock nuts 182. Adjustably positioned along the shaft are a plurality of switch contact washers 184, 186, 188, 190, 192, 194 and 196, which correspond to different log diameter positions of cutter 42 and/or tongue and groove cutters 44 and 46. Suitable electrical leads 185, 187, 189, 191, 193, 195 and 197 connect with the respective washers. A travelling switch 200 is adaptable to slide upon support rods 176 and 178 and includes a springs 202 normally biasing the switch upwardly. The switch is then connected to a cable 204, such as a Belden cable, the other end of which is attached to the movable frame of cutter 42 of cutters 44 and 46 to be controlled. The travelling switch includes a contact element 206 which is adjustable, as to its pressure toward the washer contacts, by a screw 208. Suitable insulated electrical lead 210 is connected to the contact 206.

Figure 15:
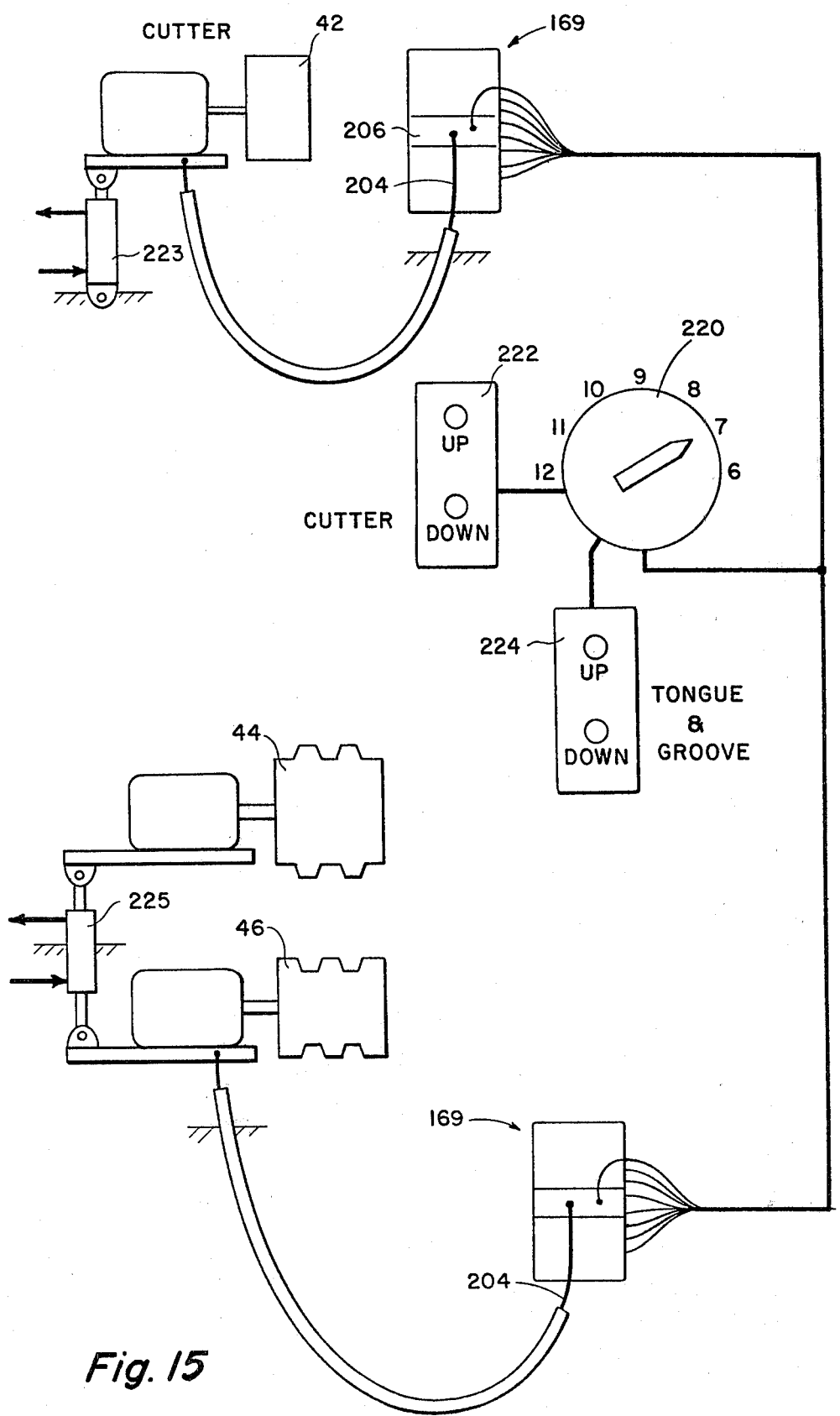
FIG. 15 is a schematic depicting the utilization of the switch of the FIGS. 12—14 herein for use in conjunction with the apparatus and the methods of the log mill patent.

FIG. 15 is a schematic diagram depicting the utilization of the switch shown in FIGS. 12, 13 and 14. In use switch 220 is dialed by the operator to the respective log diameter desired. The cutter hydraulic control 222 is then actuated as known in the art to move the cutter upwardly into the log using cylinder 223. Because cable 204 is connected to the cutter mechanism its movement will cause the movable switch 206 to travel downwardly until matching electrical contact is made with that washer of the switch which cuts off the pump and stops the flow of hydraulic fluid to cylinder 223 stopping the cutter mechanism at the desired diameter position. Likewise, during the tongue and groove operation, upon actuating the control switch 224, the tongue and groove apparatus will be directed toward the log by hydraulic cylinder 225 in accordance with the desired size indicated on dial 220.

What is claimed:

1. A machine for the machining of logs, comprising:
   (a) longitudinal frame means and carriage means movable along the top of said frame means, said carriage means including:
      coaxial rotatable spaced center means for supporting a rough log at its ends;
   (b) log positioning means at a first end of said frame means for positioning a rough log in said center means, with the axis of said log coaxial with said center means;
   (c) means to move said carriage means and rough log along said frame means toward the second end of said frame means, and means for rotating said rough log;
   (d) at least one rotating cutter means supported by said frame means adjacent the path of said log;
   whereby as said log rotates, said cutter means will cut away bark and wood until the log is cylindrical semi-finished log;
   (e) two cuttter means on self-centering means, one above and one below said semi-finished log in said carriage means, said two cutter means adapted to cut at least one tongue along the top, and at least one groove along the bottom of said semi-finished log as the carriage means carrying said semi-finished log is traversed past said two cutter means, while said semi-finished log is held rigid in said center means, whereby a nearly-finished log is provided;
   (f) vertically adjustable table means near the second end of said frame means for supporting said nearly-finished log while the center means holding it to said carriage means are released;
   (g) means for lowering said table means so that said table means and log can be lowered below the level of said carriage means,
   whereby said carriage means can be moved to said first end;
   the further improvement comprising;
      (a) means to move said log axially along said table means to and through a
      (b) log finisher means positioned coaxial with said log at the end of said table means, comprising:
      (c) housing means having an axial opening at each end and adapted to receive said log in said openings;
      (d) flexible seal curtains across said opening at each end of said housing; and
      (e) spray means intermediate the two ends of said housing means to spray the periphery of said log with selected fluids.

2. A machine for the machining of logs, comprising:
   (a) longitudinal frame means and carriage means movable along the top of said frame means, said carriage means including:
      coaxial rotatable spaced center means for supporting a rough log at its ends;
   (b) log positioning means at a first end of said frame means for positioning a rough log in said center means, with the axis of said log coaxial with said center means;
   (c) means to move said carriage means and rough log along said frame means toward the second end of said frame means, and means for rotating said rough log;
   (d) at least one first rotating cutter means supported by said frame means adjacent the path of said log;
   (e) two cutter means on self-centering means, one above and one below said semi-finished log in said carriage means, said two cutter means adapted to cut at least one tongue along the top, and at least one groove along the bottom of said semi-finished log as the carriage means carrying said semi-finished log is traversed past said two cutter means, while said semi-finished log is held rigid in said center means, whereby a nearly-finished log is provided;
   (f) vertically adjustable table means near the second end of said frame means for supporting said nearly-finished log while the center means holding it to said carriage means are released;
   (g) means for lowering said table means so that said table means and log can be lowered below the level of said carriage means, and including the further improvement comprising;
      said first cutter means hydraulically movable toward or away from said rotating log to cut the log to a desired cylindrical diameter and including first cutter hydraulic means therefor;
      at least a first switch having a plurality of fixed electrical contacts and a seeking contact movable relative to said fixed contacts,
      dial means to select a desired cylindrical diameter of log and electrically activated one of said fixed contacts on each said first switch,
      means to activate said first cutter hydraulic means and move said first cutter means,
      means to move said seeking contact of said first switch as a function of the movement of said first cutter means,
      means, upon the connection of said seeking contact with said activated fixed contact, for stopping the movement of said first cutter means.

3. A machine for the machining of logs, comprising:
   (a) longitudinal frame means and carriage means movable along the top of said frame means, said carriage means including:
      coaxial rotatable spaced center means for supporting a rough log at its ends;
   (b) log positioning means at a first end of said frame means for positioning a rough log in said center means, with the axis of said log coaxial with said center means;
   (c) means to move said carriage means and rough log along said frame means toward the second end of said frame means, and means for rotating said rough log;
   (d) at least one rotating cutter means supported by said frame means adjacent the path of said log;
   (e) two cutter means on self-centering means, one above and one below said semi-finished log in said carriage means, said two cutter means adapted to cut at least one tongue along the top, and at least one groove along the bottom of said semi-finished log as the carriage means carrying said semi-finished log is traversed past said two cutter means, while said semi-finished log is held rigid in said center means, whereby a nearly-finished log is provided;

(f) vertically adjustable table means near the second end of said frame means for supporting said nearly-finished log while the center means holding it to said carriage means are released;

(g) means for lowering said table means so that said table means and log can be lowered below the level of said carriage means;

(h) means to move said log axially along said table means to and through a log slitter means positioned to receive said log for movement therethrough, said slitter means comprising:

a frame, a power-driven saw blade supported on a framework which is rotatably supported to said frame to position said saw blade within the longitudinal path of said log, the plane of said saw blade parallel to the axis of said log, and the axis of rotation of said framework substantially coaxial with said log;

means to rotate said framework and saw blade to a desired position between and including vertical cuts, angular cuts and horizontal cuts through and parallel to the axis of said log, and platform means on said framework to move said power driven saw blade transverse to the longitudinal axis of said log.

4. In a machine of claim 3 the further improvement wherein said means to rotate said framework and said power-driven saw blade includes hydraulic or pneumatic power means.

5. In a machine of claim 3 the further improvement including an anti-kickback means pivotally resting upon said log upstream of said saw blade and including means to adjust the resting pressure of said anti-kickback means upon said log.

6. In a machine of claim 3 the further improvement comprising a log finisher to receive said log from said slitter means, said finisher comprising a housing to receive said log for movement therethrough, upstream and downstream flexible seal curtain means surrounding said log and filling the space between said housing and said log, and means between said curtain means to spray fluids upon the periphery of said log.

7. The machine as in claim 3 wherein said table means for supporting said log and moving said log into and through said slitter means comprises a moving table means.

* * * * *